(12) United States Patent
Kiyohara (10) Patent No.: US 10,095,448 B2
(45) Date of Patent: Oct. 9, 2018

(54) IMAGE DATA GENERATING APPARATUS, AN IMAGE DATA GENERATING METHOD, AND A PRINTING SYSTEM

(71) Applicant: SCREEN Holdings Co., Ltd., Kyoto (JP)

(72) Inventor: Satoru Kiyohara, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 125 days.

(21) Appl. No.: 14/548,250

(22) Filed: Nov. 19, 2014

(65) Prior Publication Data

US 2015/0213344 A1  Jul. 30, 2015

(30) Foreign Application Priority Data

Jan. 24, 2014 (JP) ................. 2014-011254

(51) Int. Cl.
  *G06F 3/12* (2006.01)
  *G06K 15/02* (2006.01)

(52) U.S. Cl.
  CPC .......... *G06F 3/1211* (2013.01); *G06F 3/1212* (2013.01); *G06F 3/1247* (2013.01); *G06F 3/1288* (2013.01); *G06K 15/181* (2013.01); *G06K 15/1805* (2013.01); *G06K 15/1806* (2013.01)

(58) Field of Classification Search
  CPC .... G06F 3/1211; G06F 3/1288; G06F 3/1212; G06F 3/1247; G06K 15/1806; G06K 15/181; G06K 15/1805
  USPC ........................................................ 358/1.15
  See application file for complete search history.

(56) References Cited

U.S. PATENT DOCUMENTS

| | | | | |
|---|---|---|---|---|
| 4,547,811 A * | 10/1985 | Ochi | .................. | H04N 1/40062 358/466 |
| 5,038,223 A * | 8/1991 | Yamada | ................ | G06T 11/001 358/445 |
| 7,835,034 B1 * | 11/2010 | Mitchell | .................. | H04N 1/52 358/3.01 |
| 2004/0165202 A1 * | 8/2004 | Nakagawa | ........... | H04N 1/3877 358/1.9 |
| 2004/0190021 A1 * | 9/2004 | Foster | .................. | H04N 1/4092 358/1.9 |

(Continued)

FOREIGN PATENT DOCUMENTS

| | | |
|---|---|---|
| JP | 2000-148973 A | 5/2000 |
| JP | 2003-259140 A | 9/2003 |

(Continued)

*Primary Examiner* — Neil R McLean
*Assistant Examiner* — Darryl V Dottin
(74) *Attorney, Agent, or Firm* — McDermott Will & Emery LLP (57) ABSTRACT

A replacing unit replaces lower bits of tone values expressed in binary numbers of the specific pixels of source image data with additional information needed in a print data creating process in a printing machine. That is, least significant bits of the tone values expressed in binary numbers of specific pixels of the source image data after RIP processing are replaced with information to be communicated to the printing machine. As the information to be communicated to the printing machine, there is multi-SPM selection information used in a halftone dot process in the printing machine.

3 Claims, 8 Drawing Sheets

(56) References Cited

U.S. PATENT DOCUMENTS

| | | | | |
|---|---|---|---|---|
| 2006/0061826 A1* | 3/2006 | Miyasaka | ............ | G09G 3/2048 |
| | | | | 358/3.13 |
| 2007/0076868 A1* | 4/2007 | Ming | ..................... | G09C 5/00 |
| | | | | 380/54 |
| 2010/0245444 A1* | 9/2010 | Asai | ..................... | B41J 2/2054 |
| | | | | 347/15 |
| 2013/0215176 A1 | 8/2013 | Hatano | | |

FOREIGN PATENT DOCUMENTS

| | | |
|---|---|---|
| JP | 2010-221584 A | 10/2010 |
| JP | 2013-169756 A | 9/2013 |

\* cited by examiner

IMAGE DATA GENERATING APPARATUS, AN IMAGE DATA GENERATING METHOD, AND A PRINTING SYSTEM

RELATED APPLICATIONS

This application claims the benefit of Japanese Application No. 2014-011254, filed on Jan. 24, 2014, the disclosures of which Applications are incorporated by reference herein.

BACKGROUND OF THE INVENTION

1. Field of the Invention

This invention relates to an image data generating apparatus, an image data generating method and a printing system for printing with a printing machine.

2. Description of the Related Art

Conventionally, a printing system is known in which a digital printing machine or the like prints, on a printing medium, data of output images for printing written in a page description language, through RIP (Raster Image Processor) processing which converts the data into raster data printable by the printing machine. As an output machine of such a printing system, an inkjet printing machine is known, which carries out printing by moving a printing medium relative to a recording head with a plurality of nozzles arranged thereon for discharging minute droplets of ink.

When printing with such an inkjet printing machine, in order to reduce density variations of the ink due to individual differences of the plurality of nozzles, print density is uniformed (which is called shading correction) using a plurality of correction values with respect to the plurality of nozzles (see Japanese Unexamined Patent Publication No. 2013-169756).

The number of droplet sizes of the ink discharged from the nozzles of the inkjet printing machine is limited (eg three—such as large, medium and small). In order to express density variations of color by dot sizes in print, a halftone dot process is carried out to create halftone image data by applying a plurality of threshold value matrices (SPM: Screen Pattern Memories) to image data. In carrying out such a halftone dot process, the printing machine is provided with a plurality of matrix sets which are combinations of the threshold value matrices, and what is called multi-SPM is employed for switching the matrix sets for each image according to the contents (natural pictures, characters, and so on) to be expressed (see Japanese Unexamined Patent Publication No. 2010-221584).

The number of nozzles becomes enormous in what is called a one-pass type inkjet printing machine which includes a recording head with ink-discharge nozzles arranged over the width of printing paper, thereby to be able to perform printing by passing the printing paper under the recording head once. In the one-pass type inkjet printing machine, therefore, the shading correction is done on the printing machine side. And the halftone dot process is executed after the shading correction is carried out on the image data having undergone the RIP processing. In order to realize multi-SPM for such an inkjet printing machine, it has been necessary to generate and supply the printing machine with data independent of the image data for communicating SPM selection information to a processor which executes the halftone dot process. Conventionally, therefore, the load of transmitting data to the printing machine has increased by an amount corresponding to the data for multi-SPM.

The increase of the load of transmitting data to the printing machine may reduce operation efficiency of the printing machine in a printing system which performs high-speed printing. While it is conceivable to increase the data transmission capacity of the apparatus in order to cope with such increase of the load of transmitting data to the printing machine, the apparatus will become expensive in that case.

SUMMARY OF THE INVENTION

The object of this invention, therefore, is to provide an image data generating apparatus, an image data generating method and a printing system which realizes a reduced load of transmitting data to a printing machine.

The above object is fulfilled, according to this invention, by an image data generating apparatus for generating image data for transmission to a printing machine, the apparatus comprising a storage unit for storing source image data after RIP processing, which expresses a tone value of each pixel in a binary number; and a replacing unit for replacing lower bits of specific pixels of the source image data stored in the storage unit with additional information for use in creating print data in the printing machine; wherein image data with the additional information embedded in the lower bits of the specific pixels of the source image data by the replacing unit for use in creating the print data in the printing machine is transmitted to the printing machine.

According to such image data generating apparatus, lower bits of tone values expressed in binary numbers of specific pixels of the image data after RIP processing are replaced with the additional information for use in creating the print data in the printing machine, and this information is embedded in the image data. Thus, there is no need to transmit to the printing machine the information to be used in creating the print data in a file separate from an image data file as done in the prior art. Since the amount of data to be transmitted to the printing machine is reduced in this way, the load of data transmission can be reduced.

In one preferred embodiment, the additional information is matrix switching information indicating which of a plurality of sets of threshold matrices to apply to each predetermined image area when the printing machine carries out a halftone dot process on the image data; and the replacing unit is arranged to replace the lower bits of the specific pixels of the source image data with the matrix switching information.

In another aspect of the invention, there is provided an image data generating method for an image data generating apparatus which generates image data for transmission to a printing machine, the method comprising a storage step for storing source image data after RIP processing, which expresses a tone value of each pixel in a binary number; a replacing step for replacing lower bits of specific pixels of the source image data stored in the storage step with additional information for use in creating print data in the printing machine; and a transmitting step for transmitting, from the image data generating apparatus to the printing machine, image data with the additional information embedded in the lower bits of the specific pixels of the source image data in the replacing step for use in creating the print data in the printing machine.

In a further aspect of the invention, there is provided a printing system having a printing machine which receives image data generated by the image data generating apparatus described above, and which performs printing, the printing machine comprising a controller including an additional information reader for reading the additional information embedded in the lower bits of specific pixels of the image data for use in creating print data in the printing machine, and a print data generator for generating the print data based on the additional information read by the additional information reader.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Figure 1:
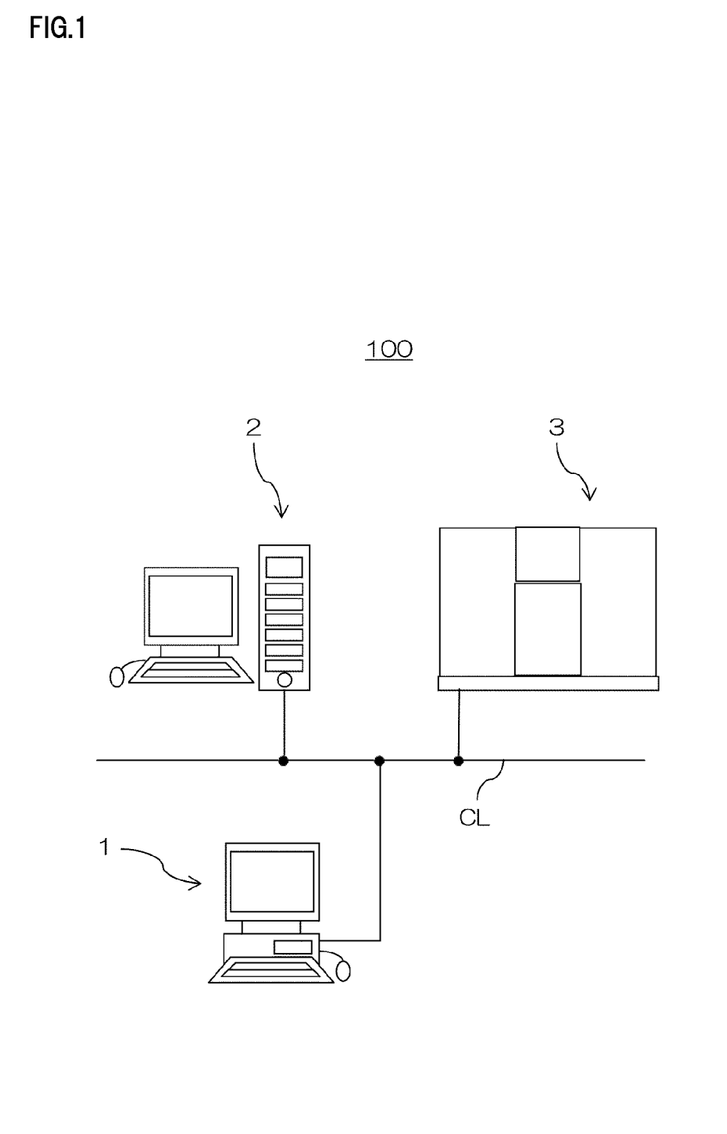
FIG. 1 is a schematic view of a printing system.

An embodiment of this invention will be described with reference to the drawings. FIG. 1 is a schematic view of a printing system 100.

This printing system 100 includes a client 1 which is an information processing apparatus for receiving manuscript data, an image data generating apparatus 2 which functions as an RIP processing apparatus for carrying out RIP processing to convert the manuscript data into raster data processable by a printing machine 3, and the printing machine 3 for carrying out printing based on the raster data. The client 1, image data generating apparatus 2 and printing machine 3 can transmit and receive various information to/from one another through a communication line CL connected to a network such as a LAN (Local Area Network).

The client 1 receives manuscript data written in a page description language such as PDF (Portable Document Format) through the communication line CL or from a storage medium such as USB memory. Then, the client 1 transmits the manuscript data to the image data generating apparatus 2 through the communication line CL. The data format of the manuscript data is not limited to page data such as PDF, but may be bitmap data such as TIFF (Tagged Image File Format) having already undergone RIP processing, for example.

Figure 2:
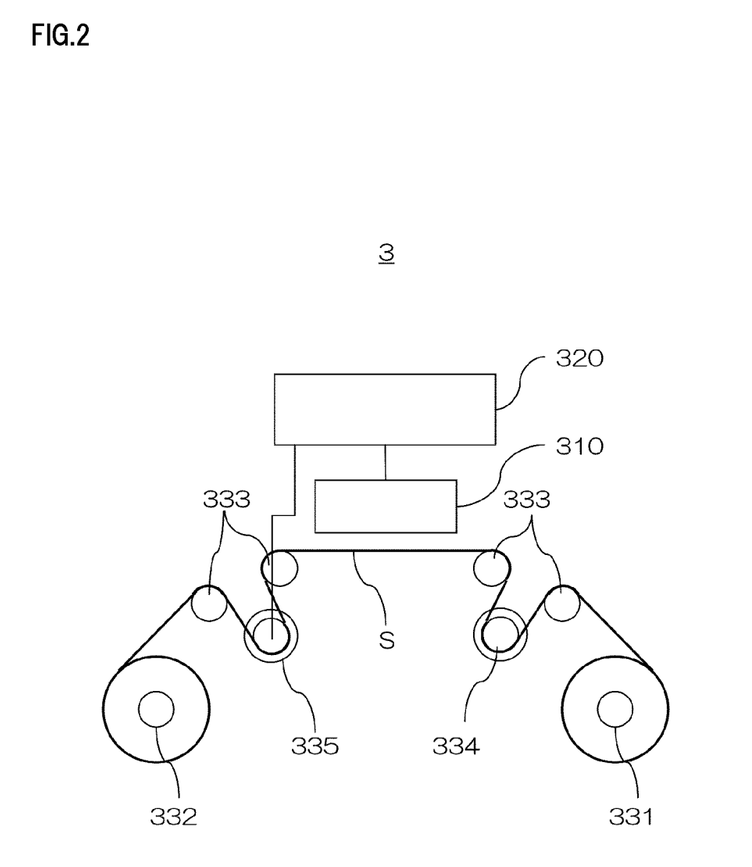
FIG. 2 is a schematic view of a printing machine.

FIG. 2 is a schematic view of the printing machine 3.

The printing machine 3 records images by an inkjet method on printing paper S which is rolled paper wound on a wind-off roller 331 a wind-up roller 332 and a plurality of tension rollers 333, and transported by a drive roller 335 rotatable by drive of a drive motor 337 described hereinafter, and a driven roller 334. This printing machine 3 includes a recorder 310 having a plurality of inkjet heads with ink-discharge nozzles arranged over the width of printing paper S, and a controller 320 for controlling operation of the printing machine 3.

Based on the image data (raster data) inputted from the image data generating apparatus 2, the controller 320 carries out printing control for discharging ink from the nozzles, and drive control of the drive motor 337. The recorder 310 has inkjet heads corresponding to ink colors of yellow (Y), magenta (M), cyan (C) and black (K), which are arranged along a transport direction of printing paper S. This printing machine 3 is what is called a one-pass type inkjet printing machine which carries out color printing by passing the printing paper S under the recorder 310 once.

Figure 3:
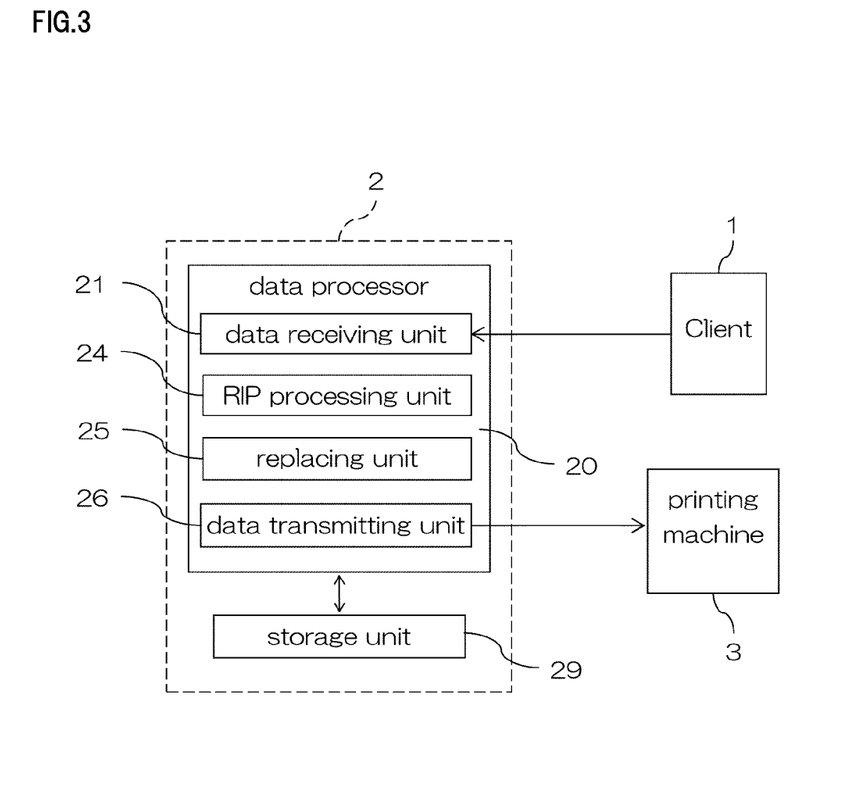
FIG. 3 is a block diagram showing a main functional construction of an image data generating apparatus.

FIG. 3 is a block diagram showing a main functional construction of the image data generating apparatus 2.

The image data generating apparatus 2 is constructed using a personal computer, and includes a CPU which is an arithmetic device, a ROM, a RAM and an HDD (hard disk) which are storage devices, a display, and input devices. The image data generating apparatus 2 can communicate with the client 1 and printing machine 3 through the communication line CL shown in FIG. 1. Various data and programs are stored in the storage devices of the image data generating apparatus 2, and the programs are executed using the arithmetic device. The image data generating apparatus 2 functions as RIP processing apparatus, with the CPU executing an RIP processing program, for example.

The image data generating apparatus 2 includes, as functional components thereof, a data processor 20 which performs various processes on the manuscript data from the client 1, and a storage unit 29 for storing data after the data processes.

The data processor 20 includes a data receiving unit 21 which receives the manuscript data from the client 1, an RIP processing unit 24 which performs the RIP processing, a replacing unit 25 which replaces part of the data after the RIP processing in the RIP processing unit 24 with additional information needed in a print data creating process in the printing machine 3, and a data transmitting unit 26 which transmits to the printing machine 3 image data with the additional information embedded in the replacing unit 25.

The RIP processing unit 24 has a plurality of RIP engines capable of RIP processing according to the file format and purpose of the manuscript data, and converts the manuscript data written in a page description language into raster data. In this specification, the term "source image data" refers to the data after the RIP processing and before the embedding of the additional information in the replacing unit 25, and the term "image data" to the data after the embedding of the additional information in replacing unit 25.

The replacing unit 25 replaces lower bits of tone values expressed in binary numbers of specific pixels of the source image data with the additional information needed in the print data creating process in the printing machine 3. That is, the least significant bits of tone values expressed in binary numbers of the specific pixels of the source image data after the RIP processing are replaced with the information to be communicated to the printing machine 3, which information has conventionally been put in a file different from the image data. As the information to be communicated to the printing machine 3, there is multi-SPM selection information used in the halftone dot process in the printing machine 3.

When this printing system 100 is used to carry out variable printing in which a design on paper is partially varied, the RIP processing is carried out separately for a fixed portion where the design is common to all pages of the manuscript data and for a variable portion where the contents are different from page to page. Then, the printing machine 3 creates data for the number of pages of the manuscript data by combining a plurality of variable portion data with one fixed portion data. Creation of such print data by combining the fixed portion and the variable portion needs mask information on a space distribution of numerical values expressed in bit values 0 and 1 which discriminate whether respective pixels of the print data are selected from the fixed portion data or are selected from the variable portion data. Such mask information is also the additional information used in creating the print data on the side of the printing machine 3 in this invention.

The storage unit 29 stores the source image data after the RIP processing, and stores also the image data after the process of embedding additional information in the replacing unit 25 and before transmitting the image data to the printing machine 3 by action of the data transmitting unit 26.

Figure 4:
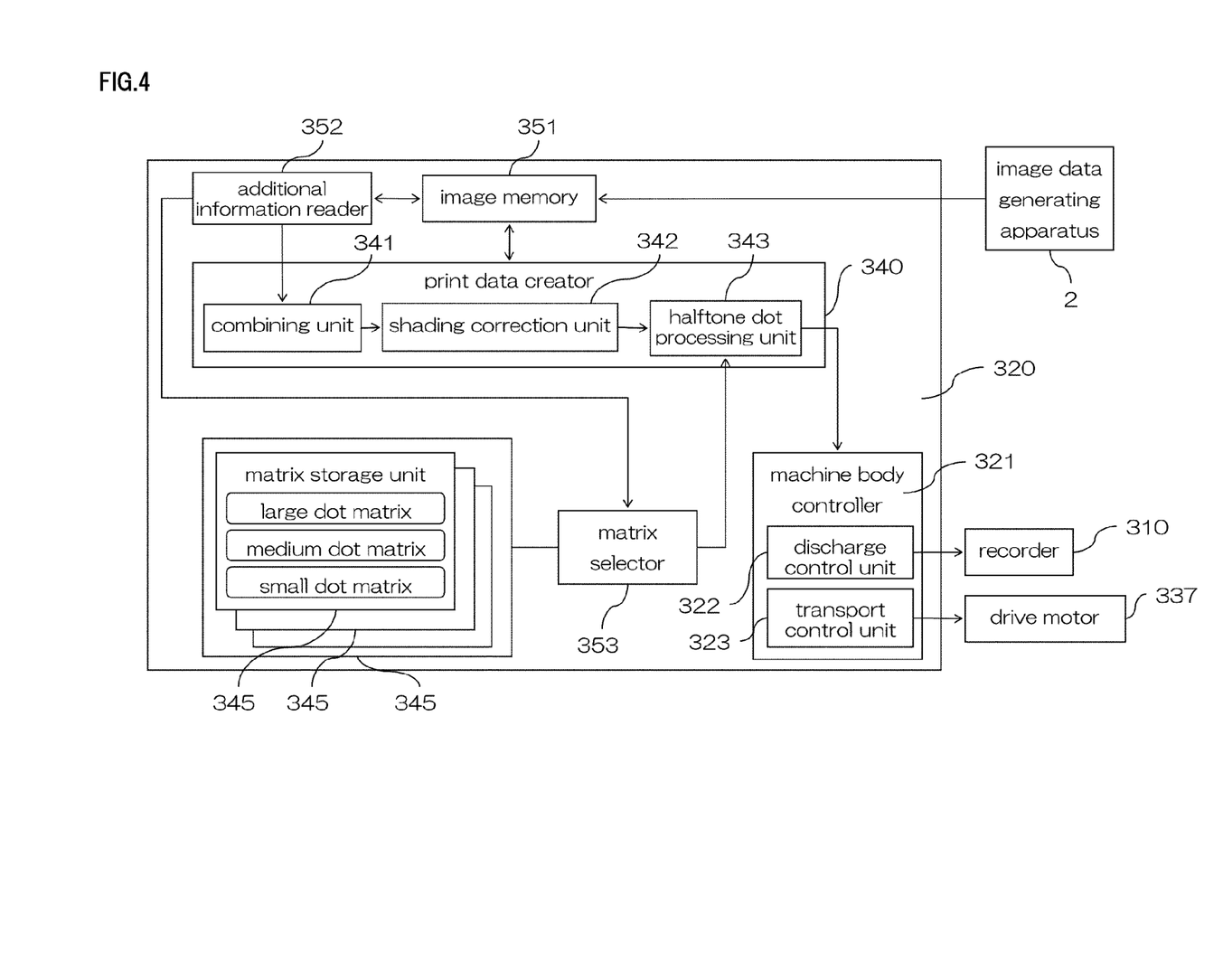
FIG. 4 is the block diagram showing a main functional construction of the printing machine.

FIG. 4 is a block diagram showing a main functional construction of the printing machine 3.

The controller 320 is in form of a computer having an arithmetic device for executing various programs, and a storage device. And various functions to be described hereinafter are realized by the computer executing the programs. The controller 320 includes, as functional components thereof, an image memory 351 which stores the image data representing multiple tone images received from the image data generating apparatus 2, an additional information reader 352 which reads the additional information embedded in the image data in the image data generating apparatus 2, a print data creator 340 which creates print data based on the image data to be used in printing, a plurality of matrix storage units (also called SPMs) 345 which are memories for storing a plurality of sets of threshold matrices, respectively, and a machine body controller 321 which controls mechanical movements of the printing machine 3.

The print data creator 340 has a combining unit 341 which combines the fixed portion data and variable portion data for carrying out variable printing, a shading correction unit 342 which carries out shading correction using a correction value peculiar to each nozzle of the recorder 310, and a halftone dot processing unit 343 which effects half-toning of images by comparing the image data and the threshold matrices for every color component.

Each matrix storage unit 345 stores, for use in the halftone dot process, a large dot matrix which is a threshold matrix for large dots, a medium dot matrix which is a threshold matrix for medium dots, and a small dot matrix which is a threshold matrix for small dots. In this printing machine 3, each of the large dot matrix, medium dot matrix and small dot matrix made available is one for FM (Frequency Modulated) screening which expresses gradation by changing the number of dots arranged irregularly. The combination of the large dot matrix, medium dot matrix and small dot matrix stored in each matrix storage unit 345 is also called a matrix set. A plurality of such matrix sets have been prepared according to the contents (natural pictures, characters, and so on) to be expressed on printing paper. That is, the plurality of matrix sets correspond to the plurality of sets of threshold matrices in this invention.

A matrix set for application to the halftone dot process in the halftone dot processing unit 343 is selected by action of a matrix selector 353 based on the multi-SPM selection information read from within the image data by the additional information reader 352, and is supplied to the halftone dot processing unit 343.

The halftone dot processing unit 343 effects half-toning of the images by comparing a pixel value of each pixel indicated by the image data having undergone the shading correction with threshold values in the large dot matrix, medium dot matrix and small dot matrix of the matrix set selected, thereby to generate the print data (halftone image data) for use in printing.

The machine body controller 321 has a discharge control unit 322 which controls the discharge of ink from each nozzle of the recorder 310 based on the print data inputted from the halftone dot processing unit 343 of the print data creator 340, and a transport control unit 323 which controls transport of the printing paper S by controlling the drive motor 337.

Further description will be made of the embedding of the additional information in the source image data in the image data generating apparatus 2, and the processing of the additional information in the printing machine 3, in the printing system 100 having the above construction.

Figure 5:
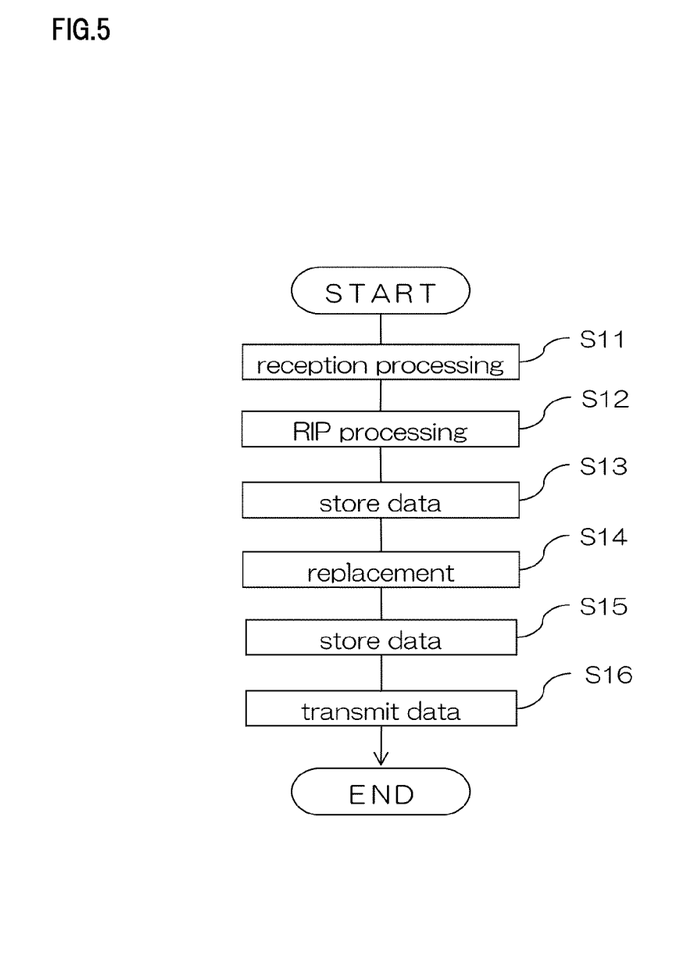
FIG. 5 is a flow chart showing a processing procedure in the image data generating apparatus.
Figure 6:
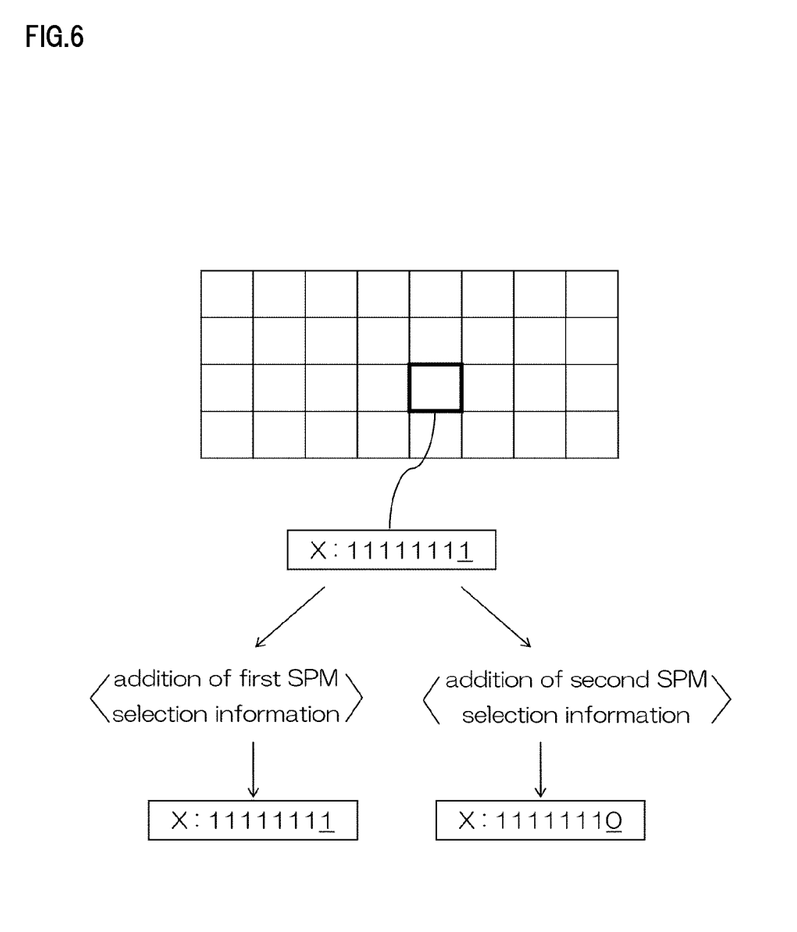
FIG. 6 is a schematic view illustrating embedding of multi-SPM selection information in image data done in the image data generating apparatus.
Figure 7:
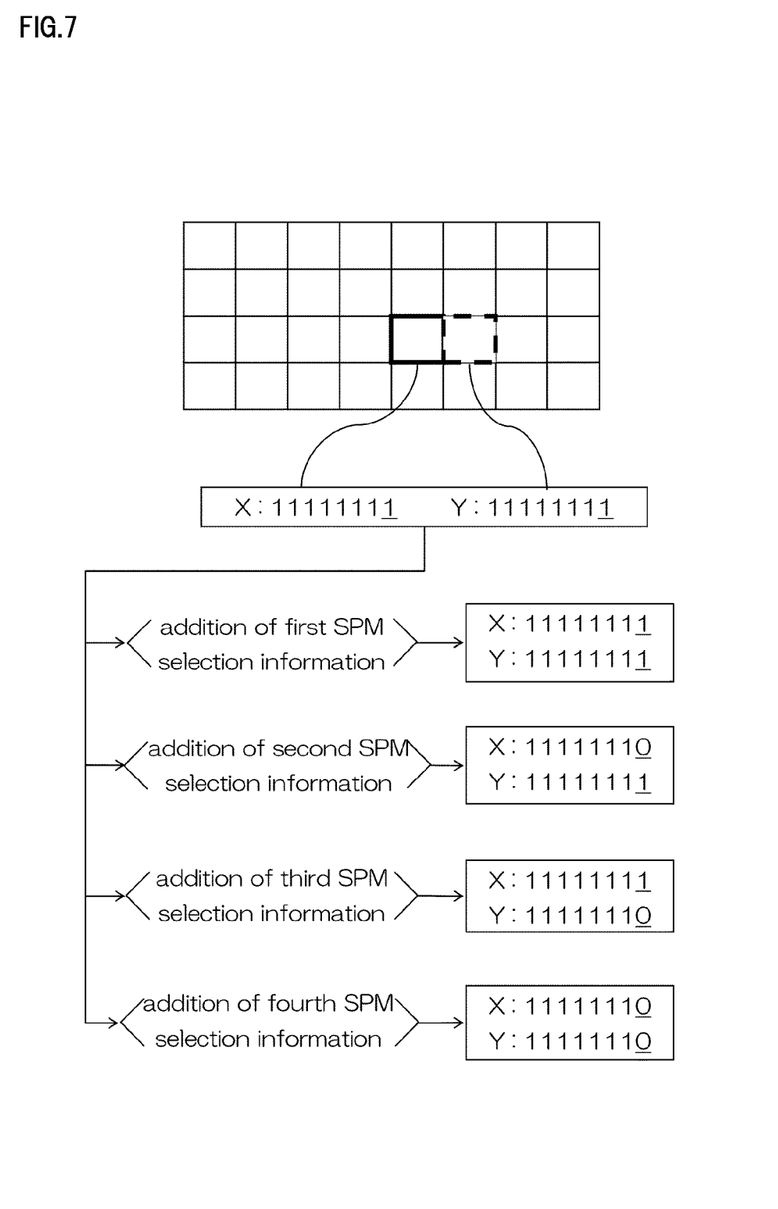
FIG. 7 is a schematic view illustrating the embedding of the multi-SPM selection information in the image data done in the image data generating apparatus.

FIG. 5 is a flow chart showing a processing procedure in the image data generating apparatus 2. FIGS. 6 and 7 are schematic views illustrating embedding of the multi-SPM selection information in the image data in the image data generating apparatus 2. One of the boxes in upper portions of FIGS. 6 and 7 corresponds to one pixel.

The image data generating apparatus 2, when manuscript data is inputted thereto, carries out reception processing such as analysis of the manuscript data (step S11), and then the RIP processing (step S12: RIP processing step). The source image data after the RIP processing is stored in the storage unit 29 (step S13: storage step). When the manuscript data is bitmap data such as TIFF, the RIP processing is omitted.

Next, the source image data is modified in order to embed the multi-SPM selection information in the source image data after the RIP processing (step S14: replacing step). In this step S14, the least significant bits of tone values expressed in binary numbers of certain designated pixels (specific pixels) are changed to express SPM information to be selected.

In an example shown in FIG. 6, tone value 255 of pixel X is expressed in 8 bits. The least significant bit 0 or 1 of pixel X is allotted to one of two types of SPM switching information. That is, when first SPM selection information is included in the image data, the least significant bit of the tone value expressed in 8 bits is represented by 1. Here, the first SPM selection information is matrix switching information for switching the matrix set applied to a pixel group including pixel X (predetermined area), to a matrix set stored in a first matrix storage unit 345 among the matrix sets stored in the plurality of matrix storage units 345. When second SPM selection information is included in the image data, the least significant bit of the tone value expressed in 8 bits is represented by 0. Here, the second SPM selection information is matrix switching information for switching the matrix set applied to the pixel group including pixel X (predetermined area), to a matrix set stored in a second matrix storage unit 345 among the matrix sets stored in the plurality of matrix storage units 345. When pixel X is modified to express the second SPM selection information, the tone value will change from 255 to 254. However, this is a slight image quality degradation, so slight that the user would be unable to recognize it visually from resulting prints, and hence no problem in printing quality.

FIG. 6 shows an example that embeds two types of SPM selection information in the image data. However, when adding four types of SPM selection information to the image data, the least significant bits 0 and 1 of certain two consecutive pixels are combined and allotted to the four types of SPM selection information. In FIG. 7, pixel X and next pixel Y have tone value 255, respectively, which is expressed in 8 bits. First SPM selection information is expressed by the least significant bit 1 of pixel X and the least significant bit 1 of pixel Y. Second SPM selection information is expressed by the least significant bit 0 of pixel X and the least significant bit 1 of pixel Y. Third SPM selection information is expressed by the least significant bit 1 of pixel X and the least significant bit 0 of pixel Y. Fourth SPM selection information is expressed by the least significant bit 0 of pixel X and the least significant bit 0 of pixel Y. When embedding such SPM selection information in the image data, the least significant bits of pixel X and pixel Y are modified according to the SPM selection information to be embedded.

In the halftone dot process in the printing machine 3 to be described hereinafter, the threshold matrices are switched by dividing each image data by a predetermined unit (eg unit of 32 pixels). This predetermined unit marks SPM boundaries and is experientially set according to the resolution of an image to be printed. Therefore, pixel X and pixel Y noted above are specific pixels allotted to the information on an SPM to be selected among the pixel group divided by the predetermined unit. And where the predetermined unit is 32 pixels, in the replacing process (step S14), SPM selection information will be embedded at intervals of 32 pixels in the image data.

When the manuscript data is data for variable printing and a combining process in the combining unit 341 is required, embedding of mask information is allotted the least significant bit of a specific pixel of variable portion data, which is another pixel adjoining above-noted pixel X or pixel Y, of the fixed portion data and variable portion data used for combination.

FIGS. 6 and 7 illustrate the examples of replacing the least significant bits of specific pixels with additional information used when creating print data in the printing machine 3. Two or more types of additional information may be expressed by combinations of two lower bits 0 and 1 if the quality of prints is unaffected.

The image data with the SPM selection information embedded in the specific pixels is stored in the storage unit 29 in the image data generating apparatus 2 (step S15), and is thereafter transmitted to the printing machine 3 by action of the data transmitting unit 26 (step S16: transmitting step).

In this invention, as described above, additional information used when creating print data in the printing machine 3 is embedded in the image data, instead of creating a file separately from an image data file for transmitting the additional information to the printing machine 3 as done in the prior art. This reduces the amount of data transmitted to the printing machine 3, thereby to reduce the load of data transmission.

Figure 8:
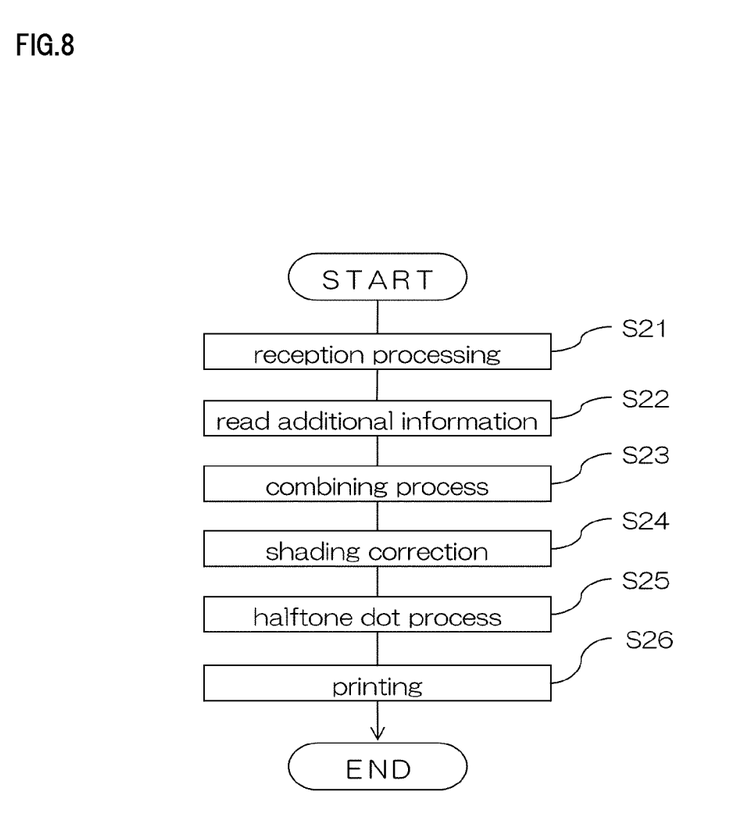
FIG. 8 is a flow chart showing a processing procedure in the printing machine.

FIG. 8 is a flow chart showing a processing procedure in the printing machine 3.

The image data transmitted to the printing machine 3 is received by the controller 320 (step S21), and the SPM selection information is read by the additional information reader 352 (step 22: additional information reading step). The image data is stored the image memory 351. In this embodiment, the reading of the SPM selection information in the additional information reading step reads whether the least significant bits of the tone values expressed in 8 bits are 0 or 1. The SPM selection information may be recognized based on whether the read tone values (decimal numbers) are even numbers or odd numbers.

When the manuscript data is data for variable printing, a combining process is carried out using the mask information embedded in the image data (step S23). When the manuscript data is not data for variable printing, this step S23 is skipped.

After the shading correction (step S24) carried out on the image data, the halftone dot process (half-toning) is executed to create print data for use in printing (step S25). The halftone dot process is carried out, based on the SPM selection information read in step S22, by applying corresponding matrix sets from the matrix storage unit 345 to each predetermined area (pixel group) of the image data.

When the print data has been created through the halftone dot process, the printing paper S is moved under control of the transport control unit 323 of the machine body controller 321. Synchronously with the movement of the printing paper S, printing is executed by discharging inks from the plurality of nozzles onto the printing paper S under control of the discharge control unit 322 and in dot sizes determined in the halftone dot process. The printing operation is carried out in each ink color of YMCK to form color images on the printing paper S (step S26).

In the embodiment described above, the printing machine 3 in the printing system 100 is what is called a roll-to-roll printing machine for printing on rolled paper. However, the printing machine 3 may be a sheet-fed printing machine. The roll-to-roll printing machine has a device configuration capable of transporting the printing paper S at a higher speed than the sheet-fed printing machine. It is therefore possible, by reducing the load of transmitting image data from the image data generating apparatus 2 to the printing machine 3 as in this invention, fully to exert the high-speed printing performance of the roll-to-roll printing machine.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2014-011254 filed in the Japanese Patent Office on Jan. 24, 2014, the entire disclosure of which is incorporated herein by reference.

What is claimed is:

1. An image data generating apparatus for generating image data for transmission to a printing machine through a network, the apparatus comprising:
   a storage device that stores source image data after RIP (Raster Image Processor) processing, the source image data comprising a plurality of pixel data each expressing a tone value of a specific number of bits;
   a first processor which carries out said generation of image data for transmission to the printing machine, the first processor configured to:
      replace lower bits of the pixel data of only specific pixels of the source image data stored in the storage device with additional information for use in creating printing data on the printing machine so as to output as the pixel data of the specific number of bits, while maintaining higher bits of the pixel data of only the specific pixels of the source image data stored in the storage device, with pixels other than the specific pixels remaining unchanged to be output as pixel data of the tone value of the specific number of bits; and transmit replaced image data with the additional information embedded therein to the printing machine through the network, wherein the additional information is matrix switching information indicating which of a plurality of sets of threshold matrices to apply to each predetermined image area when the printing machine carries out a halftone dot process on the replaced image data, and the first processor is further configured to replace the lower bits of the pixel data of the only specific pixels of the source image data with the matrix switching information.

2. An image data generating method for an image data generating apparatus which generates image data for transmission to a printing machine through a network, the method comprising:

a storage step that stores source image data after RIP (Raster Image Processor) processing, the source image data comprising a plurality of pixel data each expressing a tone value of a specific number of bits;

a replacing step that replaces lower bits of the pixel data of only specific pixels of the source image data stored in the storage step with additional information for use in creating printing data on the printing machine so as to output as the pixel data of the specific number of bits, while maintaining higher bits of the pixel data of only the specific pixels of the source image data stored in the storage device, with pixels other than the specific pixels remaining unchanged to be output as pixel data of the tone value of the specific number of bits; and a transmitting step that transmits, from the image data generating apparatus to the printing machine through the network, replaced image data with the additional information embedded therein, wherein the additional information is matrix switching information indicating which of a plurality of sets of threshold matrices to apply to each predetermined image area when the printing machine carries out a halftone dot process on the replaced image data, and the replacing step is executed to replace the lower bits of the pixel data of the only specific pixels of the source image data with the matrix switching information.

3. A printing system having a printing machine which receives replaced image data generated by the image data generating apparatus according to claim 1 through a network, and which performs printing, the printing machine comprising:

a matrix storage device that stores a plurality of sets of threshold matrices;

an image memory that stores the replaced image data received from the image data generating apparatus;

a second processor configured to:
read additional information embedded in the lower bits of specific pixels of the replaced image data transmitted from the image data generating apparatus; and
generate print data based on the read additional information, wherein the additional information is matrix switching information indicating which of a plurality of sets of threshold matrices to apply to each predetermined image area when the printing machine carries out a halftone dot process on the replaced image data, the image data generating apparatus is configured to transmit to the printing machine the replaced image data, in which the lower bits of the specific pixels of the source image data are replaced with the matrix switching information, and the second processor is further configured to generate the print data by applying, to the replaced image data stored in the image memory, threshold matrices of a set designated by the matrix switching information read from the replaced image data.

* * * * *